H. J. HANZLIK.
VALVE AND VALVE GEAR FOR ELASTIC FLUID TURBINES.
APPLICATION FILED NOV. 18, 1914.
1,227,612.
Patented May 29, 1917.
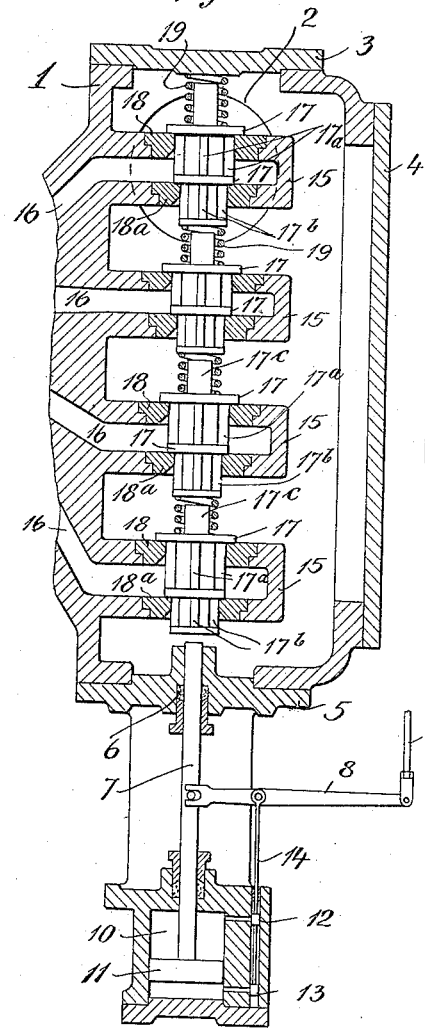
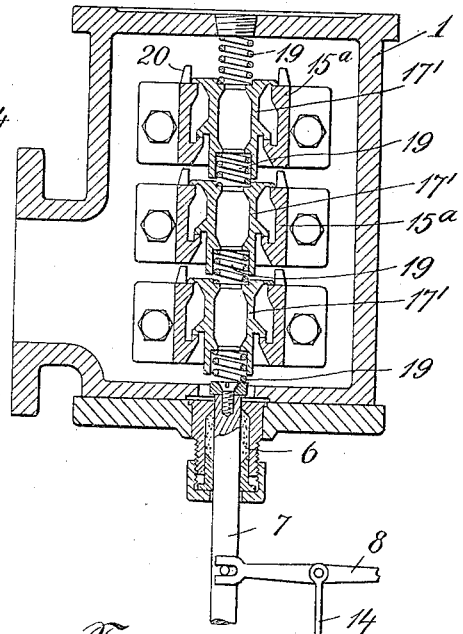
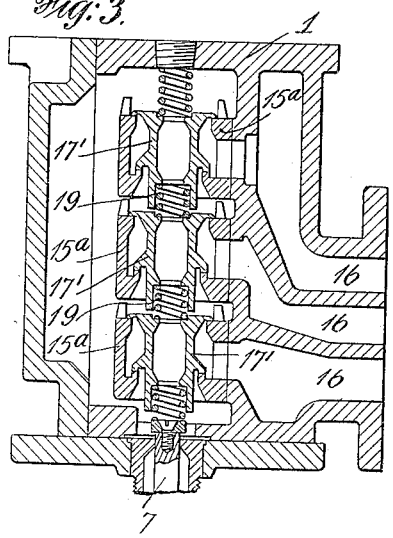
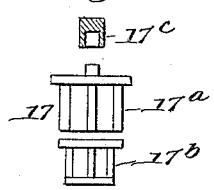
Witnesses:
Max B. A. Döring
Paul H. Franke
Inventor
Henry J. Hanzlik
By his Attorneys
Marble & Matty

UNITED STATES PATENT OFFICE.

HENRY J. HANZLIK, OF TRENTON, NEW JERSEY, ASSIGNOR TO DE LAVAL STEAM TURBINE COMPANY, OF TRENTON, NEW JERSEY, A CORPORATION OF NEW JERSEY.

VALVE AND VALVE-GEAR FOR ELASTIC-FLUID TURBINES.

1,227,612.  Specification of Letters Patent.  Patented May 29, 1917.

Application filed November 18, 1914. Serial No. 872,761.

*To all whom it may concern:*

Be it known that I, HENRY J. HANZLIK, a citizen of the United States of America, and a resident of Trenton, in the county of Mercer and State of New Jersey, have invented certain new and useful Improvements in Valves and Valve-Gear for Elastic-Fluid Turbines, of which the following is a specification.

My invention relates to improvements in valves and valve gear for elastic fluid turbines, and comprises improved means whereby a plurality of admission ports are controlled by a plurality of valves arranged to be opened and closed in succession. My invention is particularly applicable to valve gear employing valves of the so-called puppet type.

I am aware that heretofore valve gears employing a succession of puppet valves arranged to be opened and closed in succession by a single operating member have been proposed, but in most cases such valve gears have comprised a plurality of valve-lifting collars and a shouldered valve stem common to all such collars and the valves operated thereby. Such valve spindles and collars complicate the valve gear, making it rather expensive and requiring the use of larger valves, when the valves are of successively increasing size. By the present invention I avoid occasion for the use of such valve stems and collars, by causing each valve of the series itself to open, and to control the closing, of the valve next beyond. My invention consists in a valve and valve gear so arranged that the opening and closing of each valve but the first of the series is effected and controlled by other valves of the series, and in other features, as hereinafter described and particularly pointed out in the appended claims.

The objects of my invention are to simplify and render more compact and less expensive valves and valve gear comprising a plurality of valves arranged to be opened and closed in succession; to dispense with a valve spindle extending through the series of valves; and to dispense with the accompanying collars heretofore commonly provided; to reduce the number of valve gear parts and generally to make the valve gear mechanism simple, compact relatively inexpensive and efficient in operation.

I will now proceed to describe my invention with reference to the accompanying drawings, and will then point out the novel features in claims.

In the drawings:

Figure 1 shows a vertical axial section through the steam chest and valve seats of a turbine, illustrating one type of construction embodying my invention.

Fig. 2 shows a vertical axial section through the same chest and valve seats of a turbine, illustrating an alternative construction, differing slightly from that shown in Fig. 2;

Fig. 3 shows a vertical axial section of the Fig. 2 construction, the section being taken on a plane different from that of Fig. 2.

Fig. 4 shows a detail elevation and partial section of one of the valves 17, and shows the several parts of that valve separated from one another.

Referring first to Fig. 1, numeral 1 designates the steam chest provided with a steam inlet 2, with a removable top plate 3 and with a removable side plate 4; also with a removable bottom plate 5 containing a packing box 6 through the gland of which passes a stem 7 for actuating the valves hereinafter mentioned. As means for actuating these valves, I have shown a valve lever 8, connected to valve stem 7, and a valve rod 9, which valve rod 9 may be understood to extend to a suitable governor, for example, an ordinary centrifugal governor driven by the turbine; also a fluid pressure motor comprising a cylinder 10, a piston 11 connected to the valve stem 7, and piston valves 12 and 13 mounted upon a valve rod 14 connected to lever 8; the structure 7—14 constituting the well known "follow-up" fluid pressure mechanism for operating the valves of a steam turbine. The steam chest 1 is provided with hollow valve-seat brackets 15, projecting from one wall of that steam chest into the steam chest, the interior of each such bracket connected to a corresponding duct 16 formed in the wall of the steam chest. In practice these ducts 16 lead to the turbine nozzles or nozzle-rings, not shown in the drawings. Numerals 17 designate the several valves which, as shown, are of the double-seat puppet type, engaging valve seats formed on valve-seat bushings 18 and 18ª; each valve seat bushing 18ª being somewhat smaller in diameter than the corresponding seat bushing 18 so that the bushing 18ª may be dropped into place through the aperture into which the bushing 18ª fits; the valves 17 being correspondingly formed. I have shown these valves 17 provided with the usual guide-wings 17ª and 17ᵇ, coacting with the bushings 18 and 18ª respectively.

As distinguished from prior practice the valve stem 7 does not extend through the various valves 17 and has no valve-lifting collars, such valve stem 7 being arranged, when raised, to lift the lowermost valve 17 in the first instance; and as such stem 7 continues to move upward, lifting the lowermost valve 17, a boss 17ᶜ on that lowermost valve 17 engages the bottom of the next valve 17, raising such next valve 17; and so on. Owing to the play provided between each valve boss 17ᶜ and the valve 17 next above, the various valves are opened in succession, the lowermost valve opening first, and then the next valve opening, and so on. During descent of the valve stem 7 the valves close in reverse order; the topmost valve 17 seating first; then the next valve 17 seating and so on.

Preferably, though not necessarily, I provide springs 19 between the different valves, and between the topmost valve 17 and the top plate 3 of the steam chest, which springs insure the descent of the valves as such descent is permitted.

It will be apparent that by the construction shown in this figure the valve mechanism is made very compact and simple, as compared with valve mechanisms wherein the valve-spindle extends through the several valves, and carries valve-lifting collars arranged to lift the valve in succession; also that by this construction the number of parts of the valve gear is greatly reduced. The construction shown in Fig. 1 also makes exceedingly simple the assembling of the valves. It is not necessary to mount valve-lifting collars, and valves, in proper order, upon a valve stem, nor to drop each valve (except the uppermost) down through the seats for the valves above. By the mere removal of the side plate 4 of the steam chest the valve seat bushings 18 and 18ª of each valve may be dropped into place directly, and then the corresponding valve 17 may be dropped into place. While it is practicable to drop the topmost valve into place from the side of the steam chest, still it is more easy to do so through the top of steam chest, the removable cover plate 3 being provided for that purpose; also for the placing of the top spring 19.

In the alternative construction shown in Figs. 2 and 3 the construction is much the same as that shown in Fig. 1, except that the valve seat brackets, designated in Figs. 2 and 3 by reference character 15ª, are not integral portions of the steam chest, but are arranged to be bolted in place. The valves, designated in Figs. 2 and 3 by reference numeral 17', are double-disk lift valves and are not provided with guide wings, as are the valves 17 of Fig. 1, the valve seat brackets being instead provided with valve-guiding projections 20. The springs 19 between the several valves 17' are, in the construction shown in Figs. 2 and 3, located in the main within the recesses formed in said valves, and therefore are inclosed.

In all of the valve arrangements shown in the drawings, the closing of the valves is effected by the unbalanced steam pressure upon them, aided by the gravity of the valves themselves and by the action of the springs 19, in Figs. 1 and 2 and 3.

The construction of the steam chest is such that the valve seat brackets in which fit the valve seat bushings, are surrounded by steam, the steam having free circulation around these brackets; thereby insuring uniform heating of all portions of the steam chest structure, avoiding warping of tightening surfaces, and consequently avoiding leakage.

What I claim is:

1. A valve arrangement for fluid pressure motors comprising a pressure chamber having a plurality of ducts leading therefrom and valve seat orifices, one for each such duct, and a series of valves, one for each such valve seat orifice, such valves each free for movement with respect to the others and each arranged when moved from its seat to engage another valve of the series and move the latter from its seat, in combination with means for moving one valve of the series from its seat.

2. A valve arrangement for fluid pressure motors comprising a pressure chamber having a plurality of ducts leading therefrom and valve seat orifices, one for each such duct, and a series of valves, one for each such valve seat orifice, such valves each free for movement with respect to the others and each arranged when moved from its seat to engage another valve of the series and move the latter from its seat, in combination with means for moving one valve of the series from its seat, and means for returning such valves individually to their seats when such return is permitted.

3. A valve arrangement for fluid pressure motors comprising a pressure chamber having a plurality of ducts leading therefrom and two valve seat orifices for each such duct, and a series of double seat valves, one for each pair of valve seat orifices, such valves each free for movement with respect to the others and each arranged when moved from its seat to engage another valve of the series and move the latter from its seat, in combination with means for moving one valve of the series from its seat.

4. A valve arrangement for fluid pressure motors comprising a pressure chamber having a plurality of ducts leading therefrom and valve seat orifices, one for each such duct, and a series of valves, one for each such valve seat orifice, such valves each free for movement with respect to the others and each arranged when moved from its seat to engage another valve of the series and move the latter from its seat, in combination with means, disconnected from the valves, for moving one valve of the series from its seat.

5. A valve arrangement for fluid pressure motors comprising a pressure chamber having a plurality of ducts leading therefrom and valve seat orifices, one for each such duct, and a series of valves, one for each such valve seat orifice, such valves each free for movement with respect to the others and each arranged when moved from its seat to engage another valve of the series and move the latter from its seat, in combination with means, disconnected from the valves, for moving one valve of the series from its seat, and means for returning such valves individually to their seats when such return is permitted.

6. A valve arrangement for fluid pressure motors comprising a pressure chamber having a plurality of ducts leading therefrom and two valve seat orifices for each such duct, and a series of double seat valves, one for each pair of valve seat orifices, such valves each free for movement with respect to the others and each arranged when moved from its seat to engage another valve of the series and move the latter from its seat, in combination with means, disconnected from the valves, for moving the first valve of the series from its seat.

7. A valve arrangement for fluid pressure motors comprising a pressure chamber having a plurality of ducts leading therefrom, and valve seat orifices, one for each such duct, and a series of valves, one for each such valve seat orifice, such valves each free for movement with respect to the others and each arranged when moved from its seat to engage another valve of the series and move the latter from its seat, in combination with a valve-actuating stem, and means for actuating it, such valve stem disconnected from the first valve of the series but arranged, when moved in one direction, to engage such first valve and move the same from its seat, and thereafter to move such first valve to an extent sufficient to cause the successive opening of the remaining valves of the series.

8. A valve arrangement for fluid pressure motors comprising a pressure chamber having a plurality of ducts leading therefrom, and hollow valve seat brackets within such chamber and connected to such ducts, said valve seat brackets spaced apart one from another and provided with valve orifices, in combination with valves for such valve orifices, and means for actuating such valves, the spaces between the several valve seat brackets being open laterally to permit such lateral insertion of said valves.

9. A valve arrangement for fluid pressure motors comprising a pressure chamber having a plurality of ducts leading therefrom, and hollow valve seat brackets within such chamber and connected to such ducts, said valve seat brackets spaced apart one from another and provided with valve orifices, in combination with valves for such valve orifices, and means for actuating such valves, such valve seat brackets spaced apart from one another by a distance permitting the insertion of the corresponding valves through the spaces between such brackets.

10. A valve arrangement for fluid pressure motors comprising a pressure chamber having a plurality of ducts leading therefrom, hollow valve seat brackets within such chamber and connected to such ducts, and each having two orificed valve seat bushings located in suitable orifices, in the walls of the corresponding brackets, in combination with valves adapted to seat against such valve seat bushings, and means for actuating such valves.

11. A valve arrangement for fluid pressure motors comprising a pressure chamber having a plurality of ducts leading therefrom, hollow valve seat brackets within such chamber and connected to such ducts, and each having two orificed valve seat bushings located in suitable orifices in the walls of the corresponding brackets, one of such orifices in the wall of each such bracket being of a size adapted for the insertion through it of the valve seat bushing for the other orifice in said bracket, in combination with valves adapted to seat against such valve seat bushings, and means for actuating such valves.

12. A valve arrangement for fluid pressure motors comprising a pressure chamber having a plurality of ducts leading therefrom, and hollow valve seat brackets within such chamber and connected to such ducts, each valve seat bracket having valve seat orifices in two opposite walls, and a double seat valve for each such bracket having seating portions adapted to close the said orifices, one valve seat orifice of a size to permit the passage through it of the seating portion of the valve corresponding to the other valve seat orifice of that bracket.

13. A valve arrangement for fluid pressure motors comprising a pressure chamber having projecting from one wall a plurality of hollow valve seat brackets, and valves arranged to coact with the seats of said brackets, there being a separate valve for each bracket and the several brackets being spaced apart a distance permitting lateral insertion of said valves.

14. A valve arrangement for fluid pressure motors comprising a pressure chamber having projecting from one wall a plurality of hollow valve seat brackets, there being a valve-seat-bushing-orifice, in one wall of each bracket, and a valve-seat-bushing in such orifice, the several brackets being spaced apart a distance permitting lateral insertion of such valve seat bushing.

15. A valve arrangement for fluid pressure motors comprising a pressure chamber having projecting from one wall a plurality of hollow valve seat brackets, there being a valve-seat-bushing-orifice in one wall of each bracket, and a valve-seat bushing in such orifice, the several brackets being spaced apart a distance permitting lateral insertion of such valve seat bushing, said pressure chamber having, opposite such valve seat brackets a removable member by the removal of which access may be obtained to the said valve seat bushings.

In testimony whereof I have signed this specification in the presence of two subscribing witnesses.

HENRY J. HANZLIK.

Witnesses:
C. R. WALLER,
A. PETERSON.

Copies of this patent may be obtained for five cents each, by addressing the "Commissioner of Patents Washington, D. C."